United States Patent [19]
Wambeke et al.

[11] Patent Number: 5,300,732
[45] Date of Patent: Apr. 5, 1994

[54] ENVIRONMENTAL SEAL

[75] Inventors: Alain Wambeke, Zoutleeuw; Jean-Marie E. Nolf, Korbeek-Lo, both of Belgium

[73] Assignee: Raychem Corporation, Menlo Park, Calif.

[21] Appl. No.: 836,350

[22] PCT Filed: Aug. 30, 1990

[86] PCT No.: PCT/GB90/01340
§ 371 Date: May 4, 1992
§ 102(e) Date: May 4, 1992

[87] PCT Pub. No.: WO91/03854
PCT Pub. Date: Mar. 21, 1991

[30] Foreign Application Priority Data
Sep. 4, 1989 [GB] United Kingdom ............... 8919977

[51] Int. Cl.$^5$ .................. H02G 3/04; F16L 11/00
[52] U.S. Cl. .................. 174/92; 174/DIG. 8; 174/DIG. 11; 138/128; 138/156; 138/158; 138/167
[58] Field of Search .......... 174/92, DIG. 8, DIG. 11; 156/54, 56, 85, 86; 138/128, 156, 158, 167

[56] References Cited
U.S. PATENT DOCUMENTS

| | | | |
|---|---|---|---|
| 3,455,336 | 7/1969 | Ellis | 174/DIG. 8 |
| 4,498,938 | 2/1985 | Moisson et al. | 174/92 X |
| 4,499,129 | 2/1985 | Kridl et al. | 174/92 X |
| 4,761,194 | 8/1988 | Pithouse et al. | 174/DIG. 8 X |
| 4,795,509 | 1/1989 | De Bruycker | 184/DIG. 8 X |
| 4,860,799 | 8/1989 | Van Noten | 174/DIG. 8 X |

FOREIGN PATENT DOCUMENTS

| | | |
|---|---|---|
| 34500 | 8/1981 | European Pat. Off. |
| 101248 | 8/1983 | European Pat. Off. |
| 2332116 | 6/1977 | France. |
| 9001822 | 2/1990 | PCT Int'l Appl. .................. 174/92 |

*Primary Examiner*—Leo P. Picard
*Assistant Examiner*—Hyung S. Sough
*Attorney, Agent, or Firm*—Herbert G. Burkard; William D. Zahrt, II; Z. Stephen Zavell

[57] ABSTRACT

An assembly capable of sealing an elongate substrate that is curved or angled along its length, which has a heat-shrinkable wraparound sleeve (1) having closure rails (3) adjacent opposing longitudinal edges thereof which can be held together by positioning a closure member thereover to maintain the sleeve in the wrapped-around configuration during heat-shrinkage and the closure member, which comprises an elongate channel (7) of sheet material substantially C-shaped in transverse cross-section having transverse first and second slits (9, 10) therein that extend substantially entirely across its width, respective first and second slits extending through each longitudinal edge, and giving the channel flexibility in two mutually perpendicular planes.

18 Claims, 5 Drawing Sheets

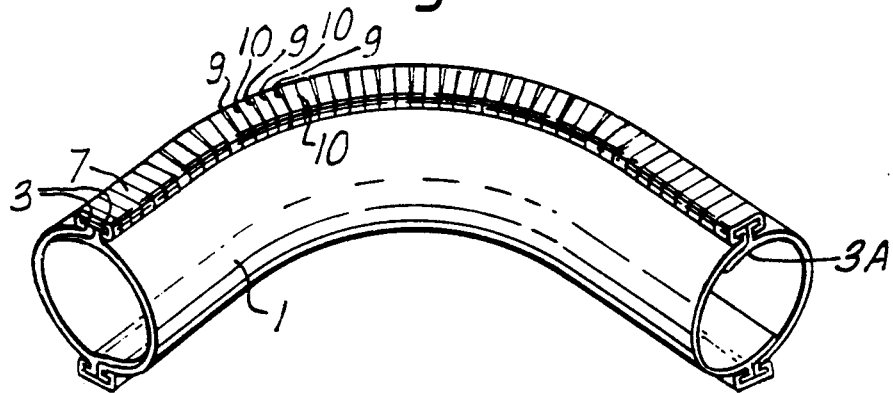
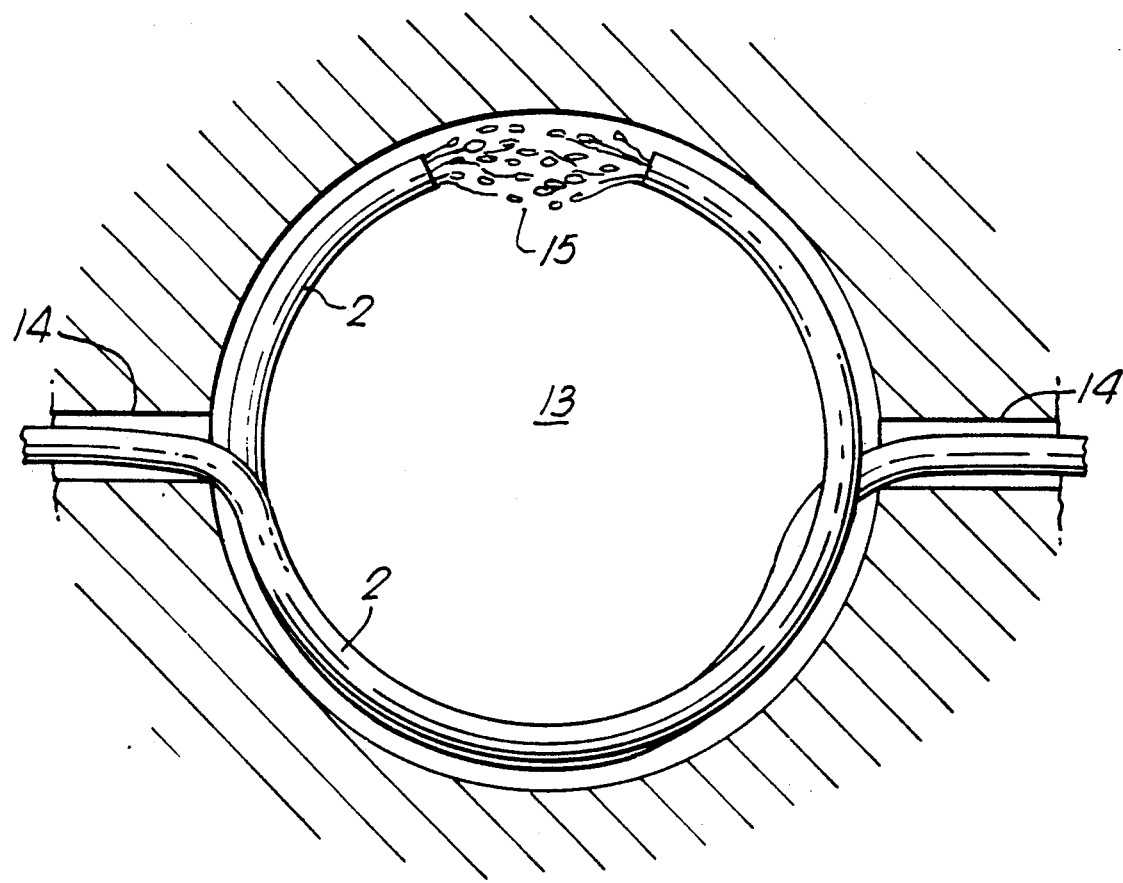

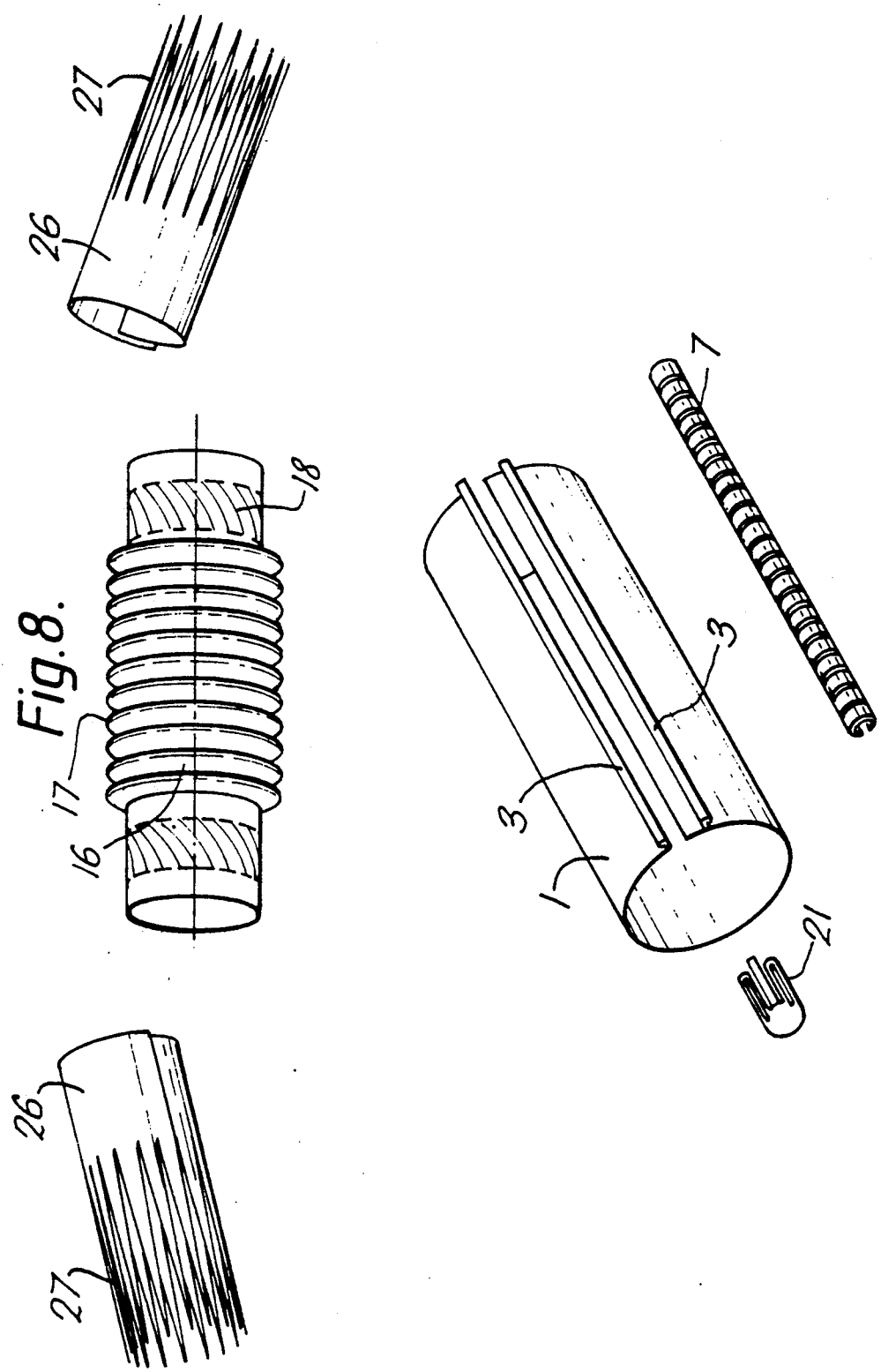

ENVIRONMENTAL SEAL

The present invention relates to the formation of an environmental seal, particularly around a cable splice or a pipe, especially in cramped conditions or otherwise where curvature of cables or pipes is to be expected.

There are many instances where it is desirable to provide an environmental seal in order to keep out contaminants such as water or to insulate electrically etc, particularly where an end of the cable or other substrate is not accessible or where it is undesirable to disconnect or otherwise displace such an end. Environmental seals for cables and pipes are frequently made by recovering (generally heat-shrinking) a dimensionally-recoverable sleeve around the cable or pipe. The sleeve is supplied over-size allowing it to be installed easily and without the need for close tolerances in manufacture, and is then shrunk generally by heating it with an open-flame torch, into sealing engagement. Many proposals have been made for ways of making such heat-shrinkable sleeves of so-called "wrap-around" design, allowing installation as mentioned above where an end of the substrate to be sealed is not accessible.

In general, a "wrap-around" sleeve is simply a sheet of material that can be installed around a substrate with no free ends and that has some means whereby it may be held in the wrapped configuration, particularly during heat-shrinkage.

The only commercially significant heat-shrinkable wrap-around sleeve is disclosed and claimed in GB1155470 (Raychem), which provides:

a closure member comprising a tubular member having a ridge extending along the length of the outer surface thereof the dimensional state of the tubular member having been changed from an original heat-stable form to a heat-unstable form, the ridge having a portion of reduced cross-section adjacent to the outer surface of the tubular member, the ridge and the member being longitudinally split, and having two portions facing each other, and fastening means for sliding over the ridge to retain the fastening portions in abutting relationship.

The disclosure of that patent and of other patents and applications mentioned below are incorporated herein by reference.

The closure of that patent has become known as the "rail-and-channel" closure. The terms "rail" and "channel" will be used below in the present specification where it is believed that their meaning will be clear. It is pointed out, nonetheless, that these terms imply no particular shape, and are not to be interpreted as requiring the shape illustrated or described in GB1155470.

Other designs of wrap-around sleeve may be briefly mentioned. EP 0034500 (Raychem) discloses a closure assembly comprising a recoverable wrap-around sleeve, and a longitudinal flexible elongate fastening member, characterized in that the fastening member comprises:

first and second wire-like or rod-like gripping portions arranged substantially parallel to, and laterally spaced from, each other with their lengths disposed substantially longitudinally relative to the fastening member, and connected to each other by each of at least three wire-like or rod-like connecting members, which lie substantially outside the plane containing the first and second gripping portions; the arrangement being such that the fastening member can grip between, and by mutual gripping action of, its first and second gripping portions one or more fastening portions of the sleeve to hold the sleeve closed during the recovery.

DE 2652617 (Raychem) disclosed a heat-recoverable wrap-around article which is made from sheet material and is adapted to recover snugly about a bend in a substrate to conform to said bend and thus substantially avoid the formation of undesired wrinkles, the article being provided with means to facilitate fastening it in position prior to recovery. The material is held closed by a rail-and-channel closure as illustrated in GB 1155470, but no explanation is given as to how the closure accommodates the curves.

Whilst those techniques, particularly that of GB 1155470, have proved useful there remains a problem in providing a cable splice closure around a highly curved splice, particularly where a cable is confined within a man-hole (which includes a hand-hole) that is curved and of small radius of curvature. The problem is made worse where a branched cable splice is to be sealed, since the branch-off limits the orientation of the rails and channel: in general the rails and channel should lie over the larger of the branching cables at a position diametrically opposite the smaller cable. This orientation is preferred where the branch-off is sealed using a branch-off clip, as disclosed and claimed in GB 1604981 (Raychem), the disclosure of which is incorporated herein by reference.

We have now designed a closure channel of improved flexibility and also various other splice case components.

Thus, the invention provides an assembly capable of sealing an elongate substrate that is curved or angled along its length, which comprises:

(a) a heat-shrinkable wrap-around sleeve having closure rails adjacent opposing longitudinal edges thereof which can be held together by positioning a closure member thereover to maintain the sleeve in the wrapped-around configuration during heat-shrinkage; and (b) said closure member, which comprises an elongate channel of sheet material substantially C-shaped in transverse cross-section having transverse first and second slits therein that extend substantially entirely across its width, respective first and second slits extending through each longitudinal edge, and giving the channel flexibility in two mutually perpendicular planes.

Generally, it will be desirable that the channel be flexible such that it can be curved in each of two opposite directions in each of the two mutually perpendicular planes referred to. Whilst use of the phrase "C-shaped" is not intended to imply limitation to the shape of any particular letter "C", reference may be made to the backbone or vertical part of the "C" as written, and to the two extending limbs or substantially horizontal parts as written. The backbone will lie along the tops of the rails of the sleeve, and the limbs will extend down the outer sides of opposite rails (and generally tuck into undercuts therein to prevent radial displacement of the channel, and therefore require that the channel be slid longitudinally over the rails).

If the sleeve is to shrink over a splice case whose diameter is thicker than the cables it joins, the sleeve after shrinkage will have a large cylindrical central portion which tapers down at each end along frusto-conical transitions to small cylindrical end portions extending along each cable a short distance at each side of the splice. Since the rails and channel must adopt this shape, the channel must be flexible in at least one plane, namely a plane that is radial with respect to the cable. It will need to be flexible in two opposite directions since it will appear convex from the large diameter to the transition, and concave from the transition to the smaller diameter. The prior art channel of GB 1155470 allows for this by having transverse slots spaced apart along the channel and extending through only the backbone or (in a separate embodiment) through only both limbs. The first and second slits of the present invention can allow for such flexibility, but provide more.

Where the spliced cable is curved, and where the sleeve is not oriented such that the rails and channel lie on the curves of minimum or maximum radius of curvature (the extreme inside and outside curves), then the channel will be forced to bend in two planes. It will in general be preferred that the rails and channel lie along a curve mid-way between the inside and outside curves. This was discussed above in connection with GB 1604981, and will be returned to below in the description of the drawings. This extra flexibility is achieved in the invention as a result of the first and second slits extending through a longitudinal edge of the channel, and generally through the "limbs" as referred to above. In order that identical channels can be used in various different circumstances, it is desirable that this extra flexibility allow curvature in each of two opposite directions. Thus, first slits extend through one longitudinal edge (one of the limbs of the "C") and the second slits extend through the other longitudinal edge (the other limb). Preferably the first and second slits substantially alternate along the channel.

The slits may be mere cuts (with no material missing or removed) particularly if, on bending, adjacent surfaces can slide over one another, but in general we prefer that the slits comprise slots of a significant width, say 1-5 mm.

A splice case may comprise more than one part along its length. For example it may comprise a central part that covers the splice itself, and end parts that provide transitions from the central part down to the cables and seal to the cables. The central part may comprise a substantially straight sleeve, and the end parts may comprise curved sleeves to accommodate curvature of the spliced cables or the angle at which the cables leave the splice. For these or other reasons it may be desirable that the first and second slits be provided spaced apart along part only of the channel, for example along a part of the channel that extends from one end to, say, one to two thirds (preferably about half) the length of the channel. The part of the channel not provided with the first and second slits will be positioned over that part of the splice case where curvature is not required. Two such channels may be used at respective end parts of a splice case. In order that the channel is not positioned incorrectly, the end thereof from which extends the part with the first and second slits may be provided with a tab or other means which prevents that end from being slid over the closure rails of the sleeve.

A part of the channel which is not provided with the first and second slits may, nonetheless, be provided with third slits, for example like those of the prior art which extend through neither longitudinal edge, said third slits giving the channel flexibility in one plane only.

The sleeve of the splice case (or at least one of them where two or more are used) may have circumferential corrugations spaced along at least part of its length. Such corrugations may aid the sleeve following a curved path and/or may allow the sleeve to be supplied in an axially compressed form and to become axially extended during installation. That may be useful where space is limited.

Such a corrugated sleeve may be radially heat-shrinkable, but in a preferred embodiment it is not. In that embodiment it is used as a central part of a splice case together with two radially heat-shrinkable sleeves, one overlapping each end of the corrugated sleeve. To improve sealing between the corrugated sleeves and the end sleeves, we prefer that end portions of the corrugated sleeves be free from corrugations, and have therefore a smooth surface onto which the end sleeves can shrink. Furthermore, we prefer that each of those end portions has an annular coating of a sealing material particularly a hot-melt adhesive which coatings preferably do not extend to the extreme ends of the corrugated sleeve, and/or to the corrugations. In this way the recoverable sleeves will overlie both the hot-melt adhesive and a portion free of adhesive. Friction during heat-installation between the overlying sleeve and the portion of the corrugated sleeve free of adhesive will help reduce the recoverable sleeve slipping of the corrugated sleeve before the adhesive has resolidified.

The invention is further illustrated by the accompanying drawings, in which:

FIG. 3 shows an assembly of the invention;

FIG. 4 shows a cable splice where the invention may usefully be used;

FIG. 8 shows a kit-of-parts.

Figure 1:
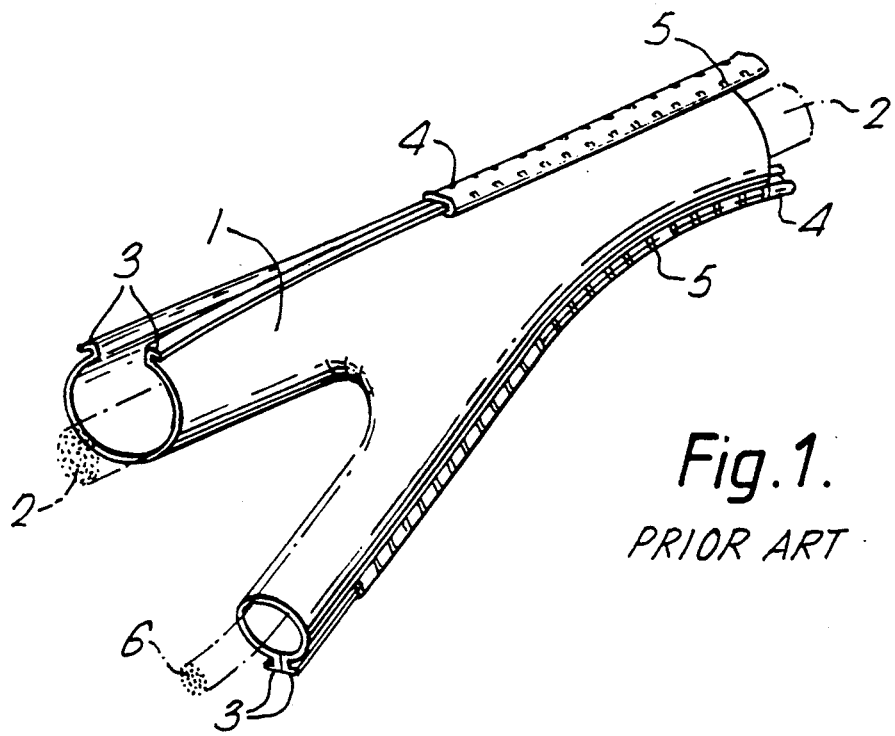
FIG. 1 shows a prior art rail-and-channel heat-shrinkable wrap-around sleeve being installed around a cable.

FIG. 1 shows a wrap-around heat-shrinkable sleeve of the type disclosed in GB 1155470 (Raychem). The sleeve has been wrapped around a cable 2, and rails 3 at opposing longitudinal edge portions of the sleeve have been brought together, and are in the process of being held together by a channel 4 which is shown partly longitudinally slid over them. The channel has slots 5 therein to give it bending flexibility, allowing for example the channel to follow the course of a branching cable 6 which is spliced to the main cable 2.

Figure 2:
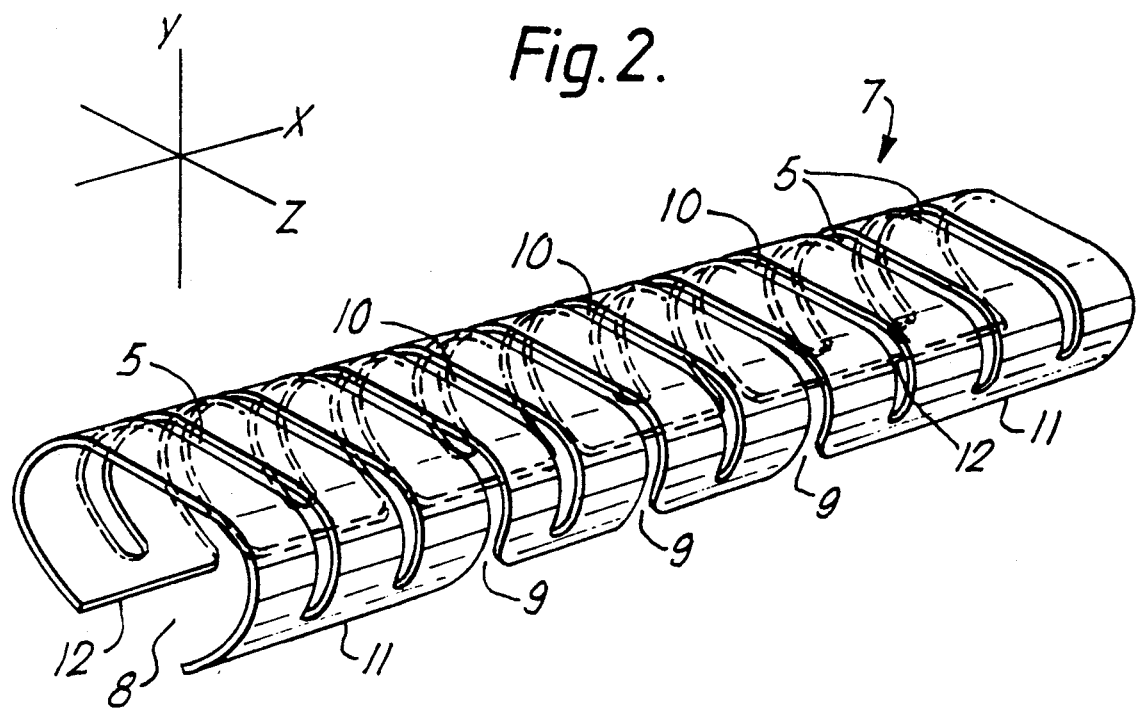
FIG. 2 shows a channel as used in the invention.

A channel 7 as used in the invention is shown in FIG. 2. The channel 7 has substantially C-shaped transverse cross-section, as shown at 8, and has alternating transverse first 9 and second 10 slits therein that extend substantially entirely across its width, first 9 and second 10 slits extending through longitudinal edges 11 and 12 respectively. These slits 9 and 10 give the channel flexibility in the plane XZ shown in the figure. Channel 7 also has third slits 5 which extend through neither longitudinal edge 11, 12. These third slits 5 (which are known in the prior art) and also the first and second slits 9, 10, give the channel flexibility in the plane XY. Slits which extend through each longitudinal edge 11, 12 but not through the backbone of the channel (the flat top as drawn) would have the same effect as slits 5. It may be noted that the slits 9, 10 in extending through edges 11, 12 do not increase flexibility in the plane YZ, and therefore do not reduce the ability of the channel to hold rails 3 (see FIG. 1 etc.) together compared with the prior art slits.

The channel shown in FIG. 2 is shown shorter than preferred, but including the preferred types of slits. In general preferred channels have from 20-50 slits, and from one to two thirds (preferably substantially one half) of the channel is provided with slits 9, 10, and the remainder with slits 5. The part with slits 9, 10 extends preferably from one end of the channel since it is often the ends of a splice case that need to be curved or angled with respect to a straight central portion, and two channels may then be used back to back, optionally separated by a sleeve with a prior art channel or by a tubular (as opposed to wrap-around) sleeve.

FIG. 3 shows an assembly of the invention comprising a heat-shrinkable sleeve 1 having rails 3 held together by the channel 7 of the invention. The sleeve has been shrunk around a curved substrate (omitted for clarity) causing slits 9 to open out at the convex side of the channel, and/or slits 10 to close together (the material either side of the slits optionally overlapping) at the concave side of the channel. This sleeve is shown with rail 3A set back from one extreme edge of the sleeve to provide a flap that underlies and bridges the abutting rails.

FIG. 4 shows a curved manhole 13, for example of the type found in the Italian telephone system. The manhole has radially-extending cable ducts 14 through which pass telecommunications cables 2. The cables 2 are spliced in the manhole 13 as shown at 15. Such a manhole may have a diameter of say, 2-3 m, for example about 2.5 m. A splice case formed around a cable in such a manhole should be able to follow such radii of curvature without undue strain. In general the products used for regular straight splice cases will be unsuitable.

Figure 5A:
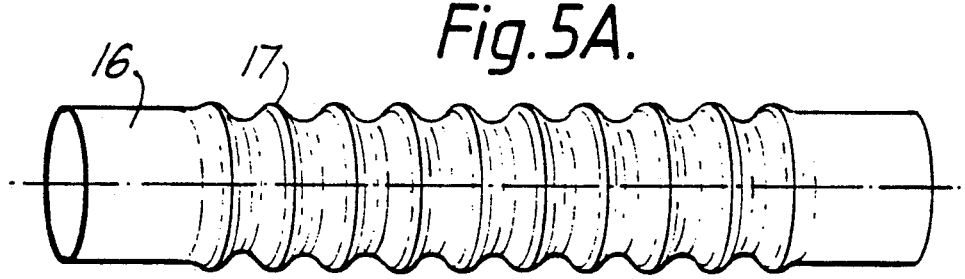
FIGS. 5A and 5B show a sleeve that may be used with the invention.
Figure 5B:
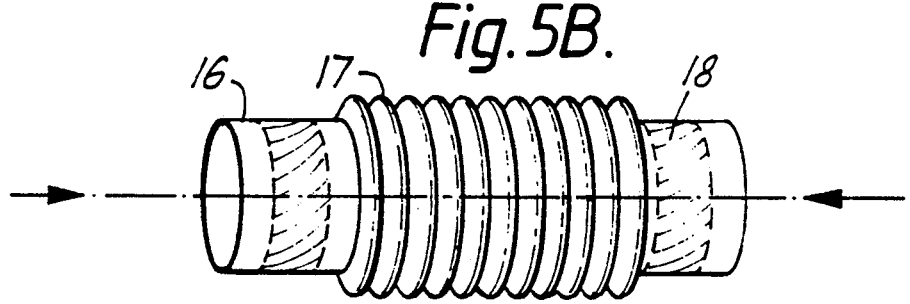

The wrap-around sleeve and channel of the invention may be used with one or more additional sleeves, for example a sleeve 16 as shown in FIG. 5 having longitudinally-spaced, circumferentially-extending corrugations 17. Such an additional sleeve may be tubular as shown, or may be of wrap-around design. The sleeve may have an annulus of hot-melt adhesive 18, preferably on a corrugated portion, and preferably bordered by non-corrugated portions free of adhesive. The sleeve 16 is preferably radially heat-stable, but need not be. It may be manufactured as shown in FIG. 5A (preferably by a method which includes cross-linking) and then heated, axially compressed as shown in FIG. 5B and then cooled. The sleeve may be provided with internal supports, particularly at each end.

Figure 6A:
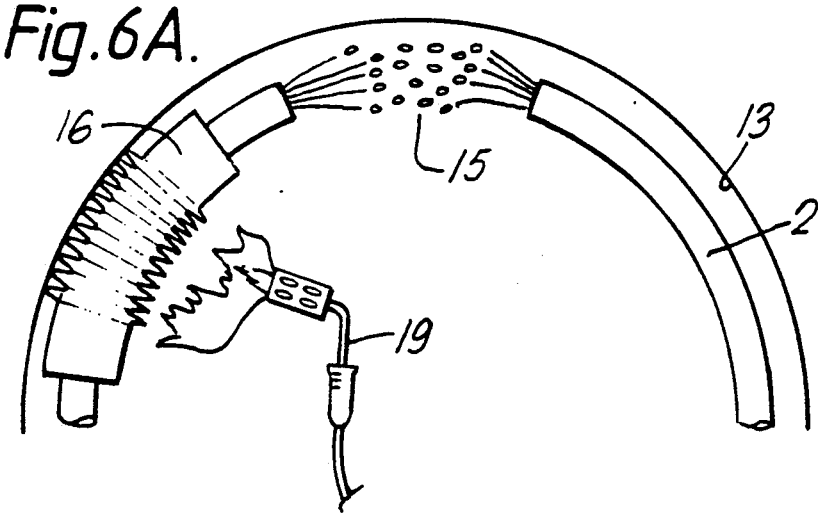
FIGS. 6A, 6B and 6C show installation of an assembly of the invention.
Figure 6B:
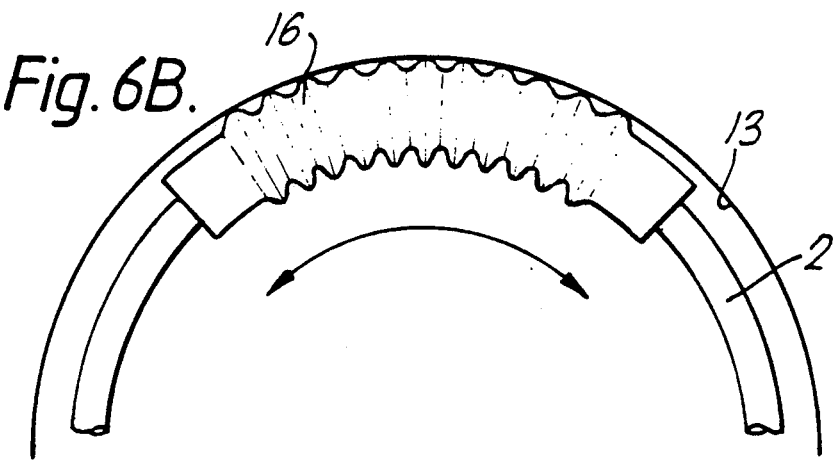
Figure 6C:
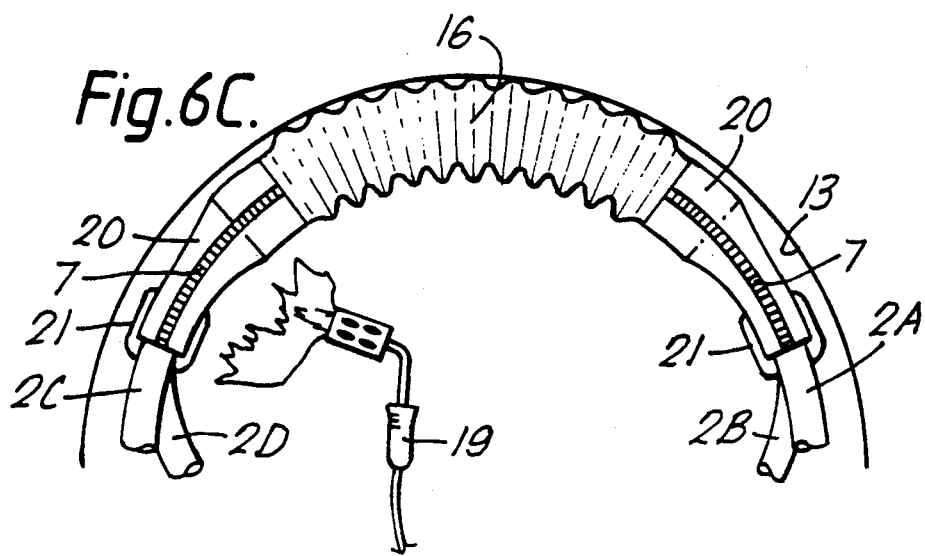

The sleeve 17 of FIGS. 5A and 5B may be used as shown in FIGS. 6A-6C.

In FIGS. 6A, 6B and 6C, curved cables 2 spliced at 15 are shown inside a curved manhole 13. The corrugated sleeve 16 is installed over one of the cables 2 (before the splice 15 is made if sleeve 16 is tubular rather than wraparound) and it is then heated to cause it to revert from its axially compressed form of FIG. 5B to its extended form of FIG. 5A. It may be heated by an open flame torch 19. Supply and initial positioning of the sleeve 16 in an axially compressed form might be desirable where space is limited, as is often the case where cables are forced to follow a tightly curved path. The corrugations also give the sleeve 16 flexibility helping it conform to the curved cable. It may be curved while still hot.

When the sleeve 16 has been correctly positioned over the splice 15, end wraparound sleeves 20 (preferably comprising a composite material) are heat-shrunk to form a seal between each end of sleeve 16 and the cables 2 at each side of the splice. Sleeves 20 have rails which are held together by channels 7, which allow the sleeves 7 to become curved.

The splice 15 may be an in-line splice between two cables as shown in FIG. 6A, or it may be a branched splice having two or more cables at one or both ends. A branched having two or more cables at one or both ends. A branched splice is shown in FIG. 6C between cables 2A, 2B, 2C and 2D. Cables are generally stacked in horizontal planes one above the other in these and other manholes, and as a result the branching cables 2B and 2D will be arranged below cables 2A and 2C. Where a seal between the branching cables is made with the aid of a branch-off clip 21 that clip will be arranged in the plane of the cables. (A branch-off clip forms two or more conduits at the end of a heat-shrinkable sleeve by bringing and holding together between the cables opposing portions of the heat-shrinkable sleeve—see GB 1604981.) This positioning of the clip clearly precludes the channel 7 being positioned on the extreme inside and outside of the cable's curve, and is instead shown positioned mid way between those curves, i.e. on the top of the cable. As a result the channel must have flexibility in two planes, firstly in the plane of the cables to follow the curve of the cables, and secondly in a perpendicular plane to deal with the transitions from sleeve 16 over the bulky splice 15, down to the cables 2.

Figure 7A:
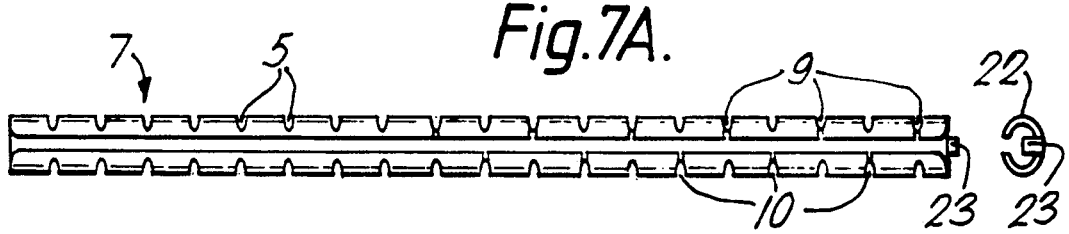
FIGS. 7A and 7B show channels as used in the invention.
Figure 7B:
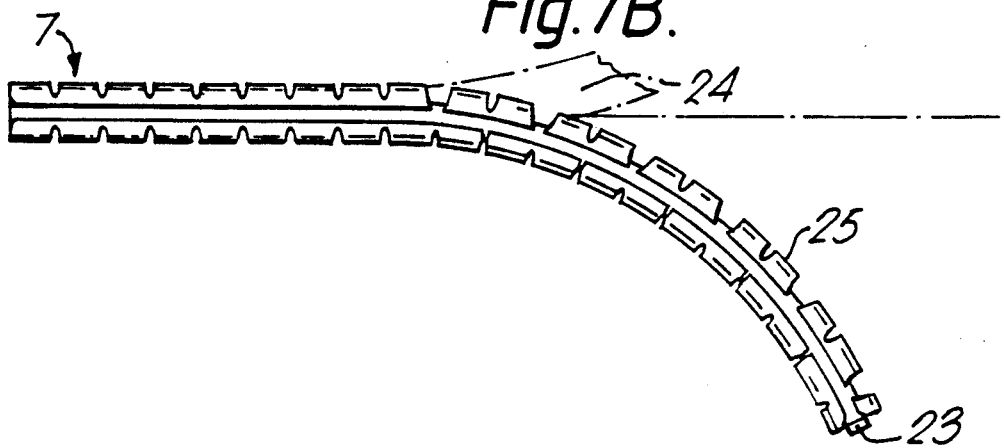

FIGS. 7A and 7B show the channel 7 of the invention. An end view is given at 22. The channel has means 23, such as a tab or other extension, at one end that prevents that end from being slid over rails 2 of a sleeve 1, and therefore forces the installer to install the channel in a given way. This ensures that it is the other end (the end with the third slots 5, rather than first and second slots 9,10) that is slid over the rails. The result is that it is the end of the sleeve over which the channel is slid that is provided with the additional flexibility. Where, of course, it is a portion at the other end that is required to have the additional flexibility, the means 23 may be provided at that other end. This feature may be useful in embodiments such as that of FIG. 6 where a wraparound sleeve is to be positioned assymetrically. In many cases, however, a single wraparound sleeve will extend completely across a symetrical splice, and it will not matter which way the channel is installed.

FIG. 7B shows that the slits 9,10 provide the channel with flexibility in the plane of the paper as drawn in two opposite directions 24, 25.

FIG. 8 shows at kit-of-parts comprising a wraparound sleeve 1, channel 7, tubular corrugated sleeve 16, liners 26 having crowned ends 27 and a branch-off clip 21.

For the avoidance of doubt it is here noted that the invention provides various articles, assemblies, kits and methods for environmental protection, particularly offering improved flexibility and/or installability especially in confined spaces. Any one or more of the sleeves, channels, clips and liners may be selected.

We claim:

1. An assembly capable of sealing an elongate substrate that is curved or angled along its length, which comprises:

(a) a heat-shrinkable wraparound sleeve having closure rails adjacent opposing longitudinal edges thereof which can be held together by positioning a closure member thereover to maintain the sleeve in the wrapped-around configuration during heat-shrinkage; and (b) said closure member, which comprises an elongate channel of sheet material substantially C-shaped in transverse cross-section having transverse first and second slits therein that extend substantially entirely across its width, respective first and second slits extending through a respective longitudinal edge, and giving the channel flexibility in two mutually perpendicular planes.

2. An assembly according to claim 1, in which first slits that extend through one longitudinal edge substantially alternate with second slits that extend through the opposite longitudinal edge.

3. An assembly according to claim 1 or 2, in which said first and second slits are provided spaced apart along part only of the length of the channel.

4. An assembly according to claim 3, in which said first and second slits are provided spaced apart along said part of the channel that extends from one end of the channel.

5. An assembly according to claim 4, in which said one end of the channel has means which prevents that end from being slid over the closure rails.

6. An assembly according to claim 3, in which another part of the closure channel has transverse third slits therein which extend through neither longitudinal edge, said third slits giving the channel flexibility in one plane only.

7. An assembly according to claim 1 having at least two said closure members (b).

8. An assembly according to claim 1, having at least two said sleeves (a).

9. An assembly according to claim 1, having at least one said sleeve (a) and at least one other sleeve.

10. An assembly according to claim 9, in which said other sleeve has circumferential corrugations.

11. An assembly according to claim 10, in which the other sleeve is longitudinally heat-extendable and/or radially heat-shrinkable.

12. An assembly according to claim 1 which additionally comprises at least one liner for mechanically supporting a heat-shrinkable sleeve, said liner having means for providing a frusto-conical end portion thereof.

13. An assembly according to claim 1, in which a heat-shrinkable sleeve thereof comprises a composite material.

14. An assembly according to claim 1, which additionally comprises a branch-off clip.

15. A method of environmentally-sealing an elongate substrate which comprises:
(a) positioning around the substrate a heat-shrinkable wraparound sleeve having closure rails adjacent opposing longitudinal edges thereof which can be held together by positioning a closure member thereover to maintain the sleeve in the wrapped-around configuration during shrinkage;
(b) holding together the rails by a closure member which comprises an elongate channel of sheet material substantially c-shaped in transverse cross-section having transverse first and second slits that extend substantially entirely across its width, respective first and second slits extending through a respective longitudinal edge, and giving the channel flexibility in two mutually perpendicular planes; and
(3) applying heat to cause heat-shrinkage of the sleeve.

16. A method according to claim 15, which said positioning step further comprises positioning the sleeve around a cable splice.

17. A method according to claim 16, in which said positioning step further comprises positioning the sleeve around a curved cable having a branched splice therein, the branch occurring in a plane substantially perpendicular to the plane of the curve, and further comprising positioning the closure member substantially in the plane of the curve.

18. For use in an assembly capable of sealing an elongate substrate that is curved or angled along its length, the assembly including a heat-shrinkable wraparound sleeve having closure rails adjacent opposing longitudinal edges thereof which can be held together by positioning a closure member thereover to maintain the sleeve in the wrapped-around configuration during heat-shrinkage, the improvement in which the closure member comprises:
an elongate channel of sheet material substantially C-shaped in transverse cross-section having transverse first and second slits therein that extend substantially entirely across its width, and respective first and second slits extending through a respective longitudinal edge, giving the channel flexibility in two mutually perpendicular planes.

* * * * *